(12) United States Patent
Lange et al.

(10) Patent No.: US 10,482,202 B2
(45) Date of Patent: Nov. 19, 2019

(54) METHOD FOR MODELING A MANUFACTURING PROCESS FOR A PRODUCT

(71) Applicant: The Procter & Gamble Company, Cincinnati, OH (US)

(72) Inventors: Stephen Joseph Lange, Cincinnati, OH (US); John Ferney McKibben, West Chester, OH (US); Jeremy Peter Carrle, Blue Ash, OH (US); Richard William Hamm, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 363 days.

(21) Appl. No.: 15/593,512

(22) Filed: May 12, 2017

(65) Prior Publication Data
US 2018/0004874 A1   Jan. 4, 2018

Related U.S. Application Data

(60) Provisional application No. 62/356,855, filed on Jun. 30, 2016.

(51) Int. Cl.
*G06F 17/50* (2006.01)

(52) U.S. Cl.
CPC ...... *G06F 17/5018* (2013.01); *G06F 2217/12* (2013.01); *G06F 2217/16* (2013.01); *G06F 2217/32* (2013.01)

(58) Field of Classification Search
CPC ............ A61F 134/51104; A61F 13/539; A61F 13/5126; B32B 38/104; B32B 37/12; B32B 27/002; B29C 64/209; B29C 64/393; B29C 35/0805; B33Y 30/00; G06F 17/5009; G09B 23/30; G06T 7/521; G06T 7/97; G06T 7/174
See application file for complete search history.

(56) References Cited

U.S. PATENT DOCUMENTS

| | | | |
|---|---|---|---|
| 6,413,360 B1 | 7/2002 | Morita et al. |
| 6,549,879 B1 | 4/2003 | Cullick et al. |
| 6,584,366 B1 | 6/2003 | Liepold et al. |
| 6,612,382 B2 | 9/2003 | King |
| 6,823,297 B2 | 11/2004 | Jenny et al. |
| 6,843,134 B2 | 1/2005 | Anderson et al. |
| 6,915,700 B2 | 7/2005 | Anderson et al. |

(Continued)

FOREIGN PATENT DOCUMENTS

| | | |
|---|---|---|
| CA | 2788919 | 4/2013 |
| CN | 1959683 | 5/2007 |

(Continued)

OTHER PUBLICATIONS

Bo, C., Generalized Predictive Control Based on Multiple Model Switch for Batch Reactor Process, Proceedings of the World Congress on Intelligent Control and Automation (WCICA), Mar. 2015, pp. 1859-1864.

(Continued)

*Primary Examiner* — Kandasamy Thangavelu
(74) *Attorney, Agent, or Firm* — William E. Gallagher; Andres E. Velarde

(57) ABSTRACT

A method for modeling a manufacturing process for an absorbent article. The method may be used in the creation of absorbent articles.

18 Claims, 6 Drawing Sheets

(56) References Cited

U.S. PATENT DOCUMENTS

| | | | |
|---|---|---|---|
| 7,024,939 | B2 | 4/2006 | Anderson et al. |
| 7,085,696 | B2 | 8/2006 | King |
| 7,209,872 | B2 | 4/2007 | Kawakami |
| 7,359,844 | B2 | 4/2008 | Sung et al. |
| 7,451,066 | B2 | 11/2008 | Edwards et al. |
| 7,546,229 | B2 | 6/2009 | Jenny et al. |
| 7,582,189 | B2 | 9/2009 | Pihola et al. |
| 7,606,689 | B2 | 10/2009 | Kawakami |
| 7,805,285 | B2 | 9/2010 | Fukaya et al. |
| 7,885,722 | B2 | 2/2011 | Pietsch et al. |
| 7,987,016 | B2 | 7/2011 | Karhu |
| 8,005,658 | B2 | 8/2011 | Tilke et al. |
| 8,244,393 | B2 | 8/2012 | McLaughlin et al. |
| 8,260,592 | B2 | 9/2012 | Schmitt et al. |
| 8,271,118 | B2 | 9/2012 | Pietsch et al. |
| 8,594,828 | B2 | 11/2013 | Stephenson et al. |
| 8,655,476 | B2 | 2/2014 | Wang et al. |
| 8,700,370 | B2 | 4/2014 | Landa |
| 8,751,208 | B2 | 6/2014 | Brouwer et al. |
| 8,849,639 | B2 | 9/2014 | Brown et al. |
| 8,892,407 | B2 | 11/2014 | Budiman et al. |
| 8,965,738 | B2 | 2/2015 | Rejman et al. |
| 9,074,454 | B2 | 7/2015 | Crick et al. |
| 2004/0207530 | A1* | 10/2004 | Nielsen ............ A61F 13/42 340/604 |
| 2005/0228632 | A1 | 10/2005 | Dobmeier et al. |
| 2009/0157367 | A1 | 6/2009 | Meyer et al. |
| 2010/0191516 | A1 | 7/2010 | Benish et al. |
| 2011/0144602 | A1* | 6/2011 | Long ............ A61F 13/42 604/361 |
| 2011/0146900 | A1* | 6/2011 | Ruman ............ A61F 13/15756 156/248 |
| 2011/0166540 | A1* | 7/2011 | Yang ............ A61F 13/15203 604/367 |
| 2011/0172803 | A1 | 7/2011 | Suzuki et al. |
| 2011/0243425 | A1* | 10/2011 | Maltbie ............ A61F 13/15203 382/154 |
| 2012/0095733 | A1 | 4/2012 | Rossi |
| 2012/0107570 | A1* | 5/2012 | Ross ............ A61F 13/5611 428/172 |
| 2013/0020028 | A1* | 1/2013 | Nakano ............ A61F 13/15772 156/356 |
| 2013/0191176 | A1 | 7/2013 | Sand et al. |
| 2013/0245582 | A1* | 9/2013 | Croizat ............ A61M 1/0088 604/319 |
| 2014/0336557 | A1* | 11/2014 | Durdag ............ A61L 15/26 602/48 |
| 2014/0358498 | A1 | 12/2014 | Zhu |
| 2015/0039281 | A1 | 2/2015 | Meyer et al. |
| 2015/0088477 | A1 | 3/2015 | Perrier et al. |
| 2015/0356237 | A1 | 12/2015 | Saito |
| 2016/0004793 | A1 | 1/2016 | Saito |

FOREIGN PATENT DOCUMENTS

| | | |
|---|---|---|
| CN | 1963824 | 5/2007 |
| CN | 101739610 | 6/2010 |
| CN | 102799742 | 11/2012 |
| CN | 104573237 | 4/2015 |
| CN | 104881715 | 9/2015 |
| DE | 19814407 | 11/1998 |
| JP | 2002160839 | 6/2002 |
| JP | 2003247198 | 9/2003 |
| JP | 2009238102 | 10/2009 |
| JP | 2013116583 | 6/2013 |
| KR | 20110131663 | 12/2011 |
| WO | WO2013157062 | 10/2013 |
| WO | WO201568257 | 5/2015 |

OTHER PUBLICATIONS

Bortolin, G. et al., Modeling of the Wet End Part of a Paper Mill with Dymola, (2004) Mathematics and Computers in Simulation, 65 (1-2), pp. 31-38.

Burchnall, Mark, An Experimental Study of the Rate Dependencies of a Nonwoven Paper Substrate in Tension using Constitutive Relations, Jan. 5, 2012, University of Cincinnati.

Deng, X. et al., A Fuzzy Based Criterion for Selecting Relevant Process Parameters for Design of Nonwoven Products, The Proceedings of the IMACS Multiconference on Computational Engineering in Systems Applications (IEEE Cat. No. 06EX1583C) (2006), 6 pp.

Deng, X. et al., Intelligent Decision Support Tools for Multicriteria Product Design, (2010) Conference Proceedings—IEEE International Conference on Systems, Man and Cybernetics, art. No. 5642407, pp. 1223-1230.

Deng, X. et al., Selection of Relevant Variables for Industrial Process Modeling by Combining Experimental Data Sensitivity and Human Knowledge, (2010) Engineering Applications of Artificial Intelligence, 23 (8), pp. 1368-1379.

Frenchard, J. et al., Advanced Optimization of Industrial Large-Scale Roll-to-Roll Systems Under Parametric Uncertainties, (2012) ASME 2012 11th Biennial Conference on Engineering Systems Design and Analysis, ESDA 2012, 1, pp. 263-270.

Hassan, Mohammad Abouelreesh Abdrabouh, Structure Property Process Relationships for Meltblown Fibrous Media, Dec. 18, 2012, North Carolina State University.

Ievtushenko, Olga, Cost Modeling of Nonwovens Manufacturing Processes, Aug. 14, 2012, North Carolina State University.

Koc, H. et al., Modeling and Control of an Industrial Accumulator in a Web Transport system, European Control Conference, ECC 1999—Conference Proceedings, art. No. 7099294, pp. 170-175.

Kuhm, D et al., Modelling and Robust Control of an Industrial Accumulator in Roll to Roll Systems, (2009) IECON Proceedings (Industrial Electronics Conference), art. No. 5414754, pp. 1645-1650.

Kuhm, D. et al., New Mathematical Modelling and Simulation of an Industrial Accumulator for Elastic Webs, (2012) Applied Mathematical Modelling, 36 (9), pp. 4341-4355.

Majumdar, A., Soft Computing in Fibrous Materials Engineering(2011) Textile Progress, 43 (1), pp. 1-95.

Martz, Y. et al., Dynamics of an Elastic WEB in Roll-to-Roll Systems Using Finite Element Method, (2014) 11th World Congress on Computational Mechanics, WCCM 2014, 5th European Conference on Computational Mechanics, ECCM 2014 and 6th European Conference on Computational Fluid Dynamics, ECFD 2014, pp. 3068-3079.

Martz, Y. et al., Robust Control in Industrial Roll-to-Roll Systems: New Approaches Using Finite Element Modeling of the Web, Proceedings of the IEEE International Conference on Industrial Technology, Jun. 2015 (June), art. No. 7125142, pp. 464-469.

Martz, Y. et al., Robust Industrial Control with Optimized Decoupling in Roll-to-Roll Systems: New Approaches Using Finite Element Modeling of the Web, IEEE International Conference on Emerging Technologies and Factory Automation, pp. 464-469.

Pian, J. et al., Iterative Learning Method Based on Variable-Structure PI and Its Application in Laminar Cooling Process, (2013) Yi Qi Yi Biao Xue Bao/Chinese Journal of Scientific Instrument, 34 (11), pp. 2478-2483.

Rajannan, Dheepak, The Effect of Web Non Homogeneity and Core Effects on Wound Roll Stress, Jul. 2011, Oklahoma State University.

Rani, L. T. et al., Multimodel Approach to the Design of Scheduling Controllers for a Class of Nonlinear System, (2014) Proceeding of the IEEE International Conference on Green Computing, Communication and Electrical Engineering, ICGCCEE 2014, art. No. 6922337.

Seshadri, A. et al., Modeling and Control of a Rotating Turret Winder Used in Roll-to-Roll Manufacturing, Control Engineering Practice, pp. 164-175.

Shao, G., Modeling and Optimization of Manufacturing Process Performance Using Modelica Graphical Representation and Process Analytics Formalism, Journal of Intelligent Manufacturing, pp. 1-15.

(56) References Cited

OTHER PUBLICATIONS

Sun, J. et al., Multi-Model Modeling Approach for Complex Process(2011) Yi Qi Yi Biao Xue Bao/Chinese Journal of Scientific Instrument, 32 (1), pp. 132-137.
Vaijapurkar, Siddharth S., Explicit Finite Element Analysis of Web-Roller Interaction in Web Process Machinery, May 2013, Oklahoma State University.
Van Elzakker et al., Optimizing the Tactical Planning in the Fast Moving Consumer Goods Industry Considering Shelf-Life Restrictions, (2014) Computers and Chemical Engineering, 66, pp. 98-109.
Vroman, P. et al., Modeling the Relationship Between Nonwoven Structural Parameters and Their Properties from Few Number of Data, (2004) Applied Computational Intelligence—Proceedings of the 6th International FLINS Conference, pp. 471-476.
Wankun Zhouo, Robust and Decentralized Control of Web Winding Systems, Nov. 2007, Cleveland State University.

\* cited by examiner

METHOD FOR MODELING A MANUFACTURING PROCESS FOR A PRODUCT

FIELD OF THE INVENTION

In general, the present disclosure relates to computer based models allowing for the customization of an article manufacturing line. The system then allows for the manufacturing of the modeled article based on the chosen modifications within the computer based model. In particular, the present disclosure relates to computer based models for the customization of a manufacturing line that may be customized based upon the desired product output thereby allowing for ordering the customized product.

BACKGROUND OF THE INVENTION

The manufacturing of absorbent articles includes the interaction of many different pieces of equipment as a web travels through the process. Each piece of equipment may transform one or more portions of the article to build the article as it travels through the manufacturing line. Often, there is a desire to make changes to the product or the manufacturing line. However, because of the complex interactions between the equipment, making a change on one piece of equipment could have multiple effects on various other parts of the line.

Large scale experiments on full production systems are costly. Using simulations of the production system to reduce the number of physically-tested options or to explore new operating regimes without taking a production system out of production has economic benefits through reduced loss of production and faster development time to market.

Individual unit operations or portions of web handling systems may be simulated using finite element modeling software such as Dassault's Simulia, as described in U.S. Pat. No. 8,700,364. However, current computational limitations of hardware and software do not permit integrated, full scale simulations of a diaper manufacturing process using these kinds of models directly in a practical solution time.

Computational experiments on these types of models can be done to generate response surface models, also known as surrogate models, to enable them to be used in more complex simulations. However, integrating these individual models is enabled using process system simulation tools described below.

As a result, it would be beneficial to develop a method that allows one to simulate an entire manufacturing line for a product that has one or more webs such as an absorbent article. Further, it would be beneficial to create a simulation that allows one to modify any portion of the simulation and will then optimize other portions of the simulation based on the desired fixed inputs.

SUMMARY OF THE INVENTION

A method for making a product comprising one or more webs is disclosed. The method includes creating a computer based three dimensional simulation of an absorbent article; defining an initial order of assembly; extracting one or more roller positions, a web path, and importing the one or more roller positions and web path to the simulation; determining the virtual measures and model properties of the absorbent article product web; importing web property data into a web converting model; evaluating the manufacturing process capability and creating one or more manufacturing performance indicators; iterating the model to optimize for a chosen variable while satisfying absorbent article requirements; building a manufacturing line based on the simulation model optimized for the chosen variable and producing an absorbent article based on the simulation.

A method for modeling a manufacturing line using a computer is disclosed. The method includes creating a computer based three dimensional simulation of an absorbent article; defining an initial order of assembly; extracting one or more roller positions, a web path, and importing the one or more roller positions and web path to the simulation; determining the virtual measures and model properties of the absorbent article product web; importing web property data into a web converting model; evaluating the manufacturing process capability and creating one or more manufacturing performance indicators; and using iterative logic to optimize the model for a chosen variable while satisfying absorbent article requirements. A method for modeling a manufacturing line using a computer is further disclosed. The method includes defining an initial order of assembly; extracting one or more roller positions and a web path, importing web property data into a web converting model for a set absorbent article; evaluating the manufacturing process capability; and using iterative logic to optimize the model for one or more variables while satisfying absorbent article requirements.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
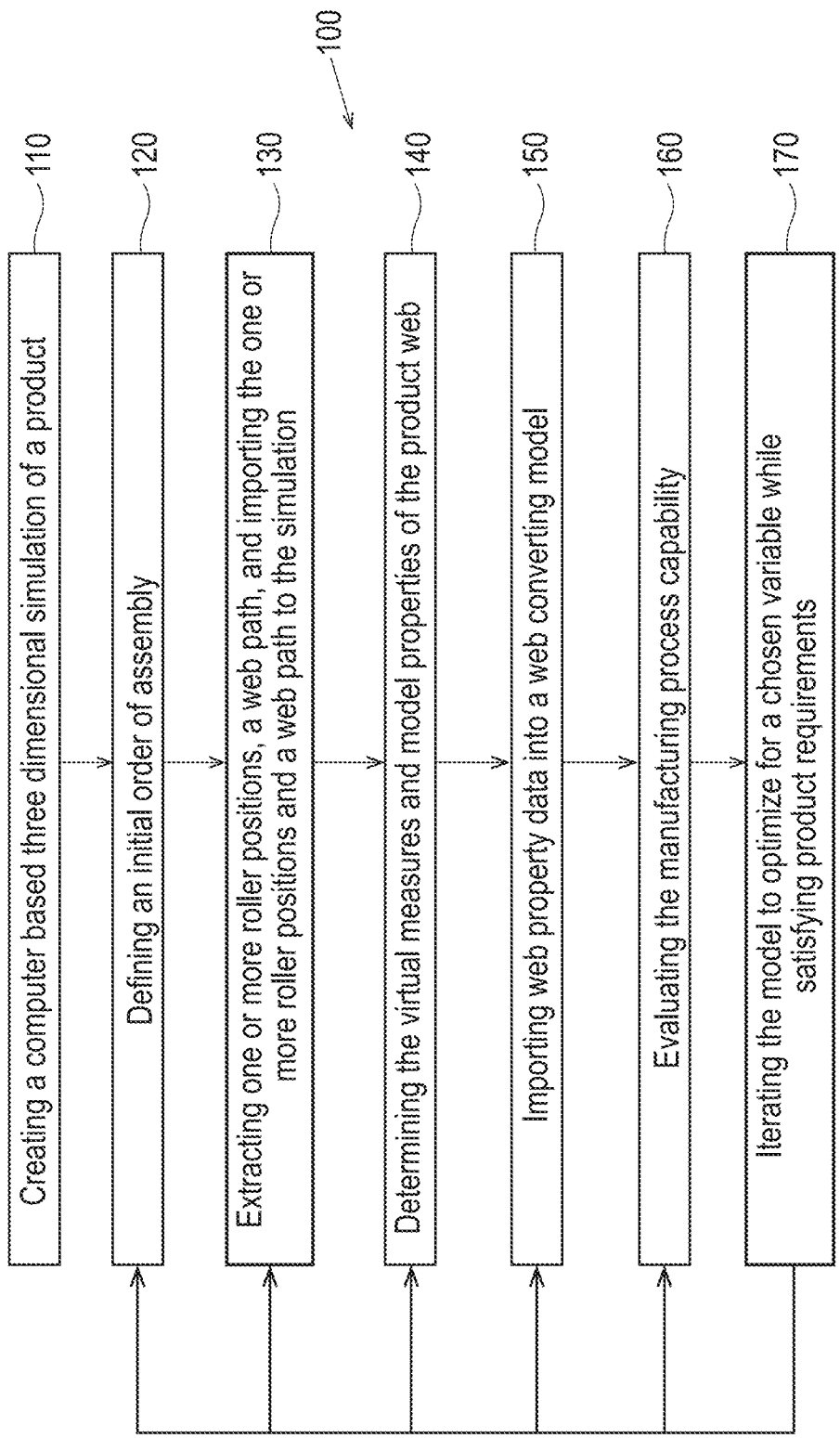
FIG. 1 is a chart illustrating a method for modeling the manufacturing process.

As used herein, "absorbent article" refers to a device or implement that has the capacity to uptake and to release a fluid. An absorbent article can receive, contain, and absorb bodily exudates (e.g. urine, menses, feces, etc.). Absorbent articles include absorbent articles placed inside the body, in particular tampons and the like. Other non-limiting examples of absorbent articles include absorbent articles worn next to the human body, in particular sanitary napkins, panti-liners, interlabial pads, diapers, pull-on diapers, training pants, incontinence products, toilet tissue, paper towels, facial tissue, wound dressings, and the like.

As used herein, "boundary conditions" are defined as variables that represent physical factors acting within a computer based model. Examples of boundary conditions include forces, pressures, velocities, and other physical factors. Each boundary condition may be assigned a particular magnitude, direction, and location within the model.

These values may be determined by observing, measuring, analyzing, and estimating real world physical factors. Computer based models may also include one or more boundary conditions that differ from real world physical factors to account for inherent limitations in the models and to more accurately represent the overall physical behaviors of real world things, as will be understood by one of ordinary skill in the art. Boundary conditions may act on the model in various ways, to move, constrain, and deform one or more parts in the model.

As used herein, "initial conditions" are defined as variables that represent initial factors acting within a computer based model.

As used herein, a "predictive simulation" relates to a computational simulation related to an item that may flow over time wherein the method utilizes nodes, particles, or a parameterized surface that may be tracked within a material. Materials may include a fluid or a solid. Predictive simulation utilizes physics based properties including quantifiable physical quantities related to the material that may be measured in a real world scenario. Quantifiable physical quantities include but are not limited to, for example, modulus and density. A predictive simulation requires outputs beyond position that affect the material such as, for example, stress, strain, and temperature. An example of a "predictive simulation" is Finite Element Analysis (FEA).

As used herein, "product requirements" and/or "absorbent article requirements" refers to dimensions and specifications for one or more components of the product.

As used herein, "transitive mapping software" refers to software that allows for one-to-one correspondence of the artwork pixels across all the geometry frames, including the final one.

Values disclosed herein as ends of ranges are not to be understood as being strictly limited to the exact numerical values recited. Instead, unless otherwise specified, each numerical range is intended to mean both the recited values and any integers within the range. For example, a range disclosed as "1 to 10" is intended to mean "1, 2, 3, 4, 5, 6, 7, 8, 9, and 10."

Embodiments disclosed herein include methods of simulating a manufacturing process having multiple components that each add to the manufacturing of a product having one or more webs. The product may be, for example, a tissue, a film enclosure formed by two or more films, or an absorbent article. As described below, the method may be used in the design and manufacturing of an absorbent article. While exemplary, the method below may be utilized any web based product, such as, for example, a mop or a duster that has webs of materials and is not limited to absorbent articles. In an embodiment, the method simulates how different changes to the manufacturing process change or affect other portions of the manufacturing process to create a product comprising one or more webs. For example, one may choose to hold certain variables as constants for a portion of the manufacturing process. The simulation will then determine the appropriate order for the manufacturing elements and the proper settings to create an article while holding the variables constant. For example, certain process variables may be set as constants, while other variables, such as material properties, may be changed to see the effects and to optimize process variable setpoints to reduce unwanted changes in the process output variables. Or the order of operations may be changed to see the effect on process outputs.

Unlike prior modeling systems that focus on a particular portion of an article, Applicants have found that by integrating multiple processes within a simulation and creating fixed objectives, the simulation can modify a manufacturing process and the materials used in the manufacturing process in an iterative model to produce the optimal manufacturing process for a product having one or more webs that meets the set objectives. The integration of multiple units in a self-responding feedback loop that allows the simulation to modify multiple variables simultaneously serves as an improvement in the manufacturing process and a software-based invention that improves the performance of the computer system itself allowing one to make changes without having to either make guesses on the design or tweak settings in the manufacturing process with the hope that they are correct for a given product.

Also included is a computing device that includes a memory component that stores logic that causes the system to receive a computer based simulation of an absorbent article. The logic simulates physical changes within the absorbent article that are controlled by the user of the simulation.

Also included is a non-transitory computer-readable medium that stores a program that when executed by a computing device causes the computing device to receive a computer based simulation of the manufacturing process. The system then simulates modifications to different aspects of the manufacturing line. In an embodiment, the system may extract one or more frames of finite element analysis to establish mapping of the manufacturing process.

Computer aided engineering (CAE) is a broad area of applied science in which technologists use software to develop computer based models that represent real world things. The models can be transformed to provide information about the physical behavior of those real world things, under certain conditions and over particular periods of time. With CAE, the interactions of the computer based models are referred to as simulations. Sometimes the real world things are referred to as a problem and the computer based model is referred to as a solution.

Commercially available software can be used to conduct CAE. ABAQUS, LS-DYNA™, Fluent, from ANSYS™, Inc. in Canonsburg, Pa., Flow3D™, from Flow Science, Inc. in Santa Fe, N. Mex., and FeFlow™ from DHI-WASY in Berlin, Germany are examples of commercially available CAE software. Other commercially available software includes Maya, 3DS Max, Cinema 4D, and Houdini. The current method may also utilize a commercially available 3D runtime engine traditionally used for games or other 3D content presentations such as, for example, Unreal, Crysis, Unity, VirTools, and combinations thereof. ABAQUS™, LS DYNA™, ANSYS™, and MARC™ are examples of commercially available Structural Analysis software. The Structural Analysis software may utilize finite element analysis (FEA). In FEA, models representing mechanical articles, as well as their features, components, structures, and/or materials are transformed to predict stress, strain, displacement, deformation, and other mechanical behaviors. FEA represents a continuous solid material as a set of discrete elements. In FEA, the mechanical behavior of each element is calculated, using equations that describe mechanical behavior. The results of all of the elements are summed up to represent the mechanical behavior of the material as a whole.

Alternatively, CAE software or any derivative such as FEA software can be written as custom software or may be open source code software. FEA and CAE software can be run on various computer hardware, such as, for example, a personal computer, a minicomputer, a cluster of computers, a mainframe, a supercomputer, or any other kind of machine on which program instructions can execute to perform functions.

Graphic rendering relates to the addition of graphics to an image or data structure. The image or data structure may include geometry, viewpoint, texture, lighting, and shading information as a description of the virtual scene. Commercially available graphic rendering tools may be used to simulate the graphics on a package. Such tools include, for example, Maxwell®, Mental Ray® and Vray®.

CAE models utilizing graphic rendering tools can represent a number of real world things, such as an absorbent article either on a user or by itself and all of the physical components of the absorbent article.

Referring now to the drawings, FIG. 1 shows a simplified flowchart of one embodiment of the present invention for simulating an absorbent article manufacturing process.

The method 100 includes a first step 110 of creating a computer based three dimensional simulation of a product, such as, for example, an absorbent article. The simulation may be created in 3Dimensional CAD.

Absorbent articles are commonly comprised of laminated layers of webs, adhesives, powders, and fibers, resulting in three dimensional products. These 3D products may be represented in 3D CAD solid modeling software, such as SolidWorks, NX, SolidEdge, etc. as a collection of layers in a specified orientation in all three dimensions. Each layer may contain a variety of component parts, such as adhesive patterns, curvilinear components such as fastening tabs or simple rectangular components such as topsheets or mechanical fastener loop panels. The modeling of the article may be done as described in U.S. Pat. No. 9,092,585 entitled "Computer Based Models for Absorbent Articles" granted on Jul. 28, 2015 or U.S. Pat. No. 7,979,256 entitled "Determining Absorbent Article Effectiveness" granted on Jul. 12, 2011.

The computer based model of the product may be created with dimensions that are similar to, or the same as, dimensions that represent parts of a real world absorbent article. These dimensions may be determined by measuring actual samples, by using known values, or by estimating values. Alternatively, a model of an absorbent article may be configured with dimensions that do not represent a real world absorbent article. For example, a model of an absorbent article may represent a new variation of a real world absorbent article or may represent an entirely new absorbent article. In these examples, dimensions for the model may be determined by varying actual or known values, by estimating values, or by generating new values. The model may be created by putting values for the dimensions of parts of the absorbent article into the modeling software. Additionally, the simulation may determine the optimum dimensions for a given set of conditions, including accounting for possible variations in the nominal dimensions.

The computer based model of the product may be created with material properties that are similar to, or the same as, material properties that represent a real world absorbent article. These material properties may be determined by measuring actual samples, by using known values, or by estimating values. Alternatively, a model of an absorbent article may be configured with material properties that do not represent a real world absorbent article. For example, a model of a package may represent a new variation of a real world absorbent article or may represent an entirely new absorbent article. In these examples, material properties for the model may be determined by varying actual or known values, by estimating values, or by generating new values. Additionally, the simulation may determine the optimum material properties for a given set of conditions.

The computer based model of the product may be created with a mesh for the surface of the absorbent article. In an embodiment, an external surface of the absorbent article may be created by using shell elements, such as linear triangular elements (also known as S3R elements) with an element size of about less than 10 mm such as, for example, less than 5 mm, less than 4 mm, less than 3 mm, less than 2 mm, and 1.5 millimeters. Also, a material may be created by using solid elements, such as linear hexahedral elements (also known as C3D8R elements) with an element size of about 1.5 millimeters.

Many data structures are possible for representing the mesh of the absorbent article. In one embodiment, a data structure for the absorbent article: representing the parts by a set of nodes, and for the connected edges, classifying the edges of the polygons into connection nodes, wherein two edges that are in the same connection node have end-points on the same node.

The method 100 includes a second step 120 of defining an initial order of assembly. The order of assembly may be modified based upon the variables that are kept constant in the system.

After creating the desired product in 3Dimensional CAD, its order of assembly may also be defined. This order of assembly describes the relationship between components, such as to which layer an adhesive is applied and then subsequently bonded to another layer. It describes the process order in which the components are shaped, laminated, bonded, etc., from raw material state to finished product. The 2D layout of each component on each layer is defined with dimensional relationships. The order of assembly may be defined in flowcharting software such as Visio (Microsoft), showing where each component enters the production flow and how the product is built step-by-step. Both the output of the 3D CAD and the Visio Order of Assembly information may be digitally exported, for example using XML code, enabling export to other simulation or PLM (product lifecycle management) software.

The method 100 includes a third step 130 of extracting roller position, extracting web path, and exporting the roller position and web path to the simulation. In addition to roller positions, the web path may also include web handling elements such as, for example, folding boards and turn bars. It is desirable to perform models of the transport of continuous webs of materials with equipment used for the manufacture of disposable absorbent articles. This requires extraction of specific information about the path the continuous web makes through the production equipment from unwind stands to combining points and through composite webs made of multiple materials.

Initially it is necessary to create a list of the web handling parts of interest including CAD part numbers. Such parts will include idlers, driven rollers, folding boards, turn bars and unwind mandrels as well as other parts such as, for example, adhesive application equipment such as, for example, slot coaters. This list can be a combination of items in a database of common web handling equipment parts and list of special purpose equipment. Said database could include additional equipment information such as the nominal idler bearing drag, moment of inertia, and surface treatment that are necessary for the web path modeling.

Geometry information for these parts, (e.g. idler location, orientation, diameter and length) can be extracted from 2D or 3D CAD representations of the equipment. It is also possible to enter this information directly into a data file, for example a comma separated variable file, in the event that CAD information is not available.

The web path can be defined by creating an ordered list of the parts that the web touches. The preferred approach to do this is to create 3D representations of the equipment in a computer user interface that can be interactively clicked on to create the web path list. Provisions should be made for editing the list to add or remove elements as necessary in design iterations.

Ideally, the web path would include information about the specific material being conveyed such as, for example, web material properties and web dimensions. This information should be extracted from a digital representation of the product design, but could be entered manually. At a minimum, the web information needs to include a material name, a unique material identifier and the relaxed web width.

For ease of modeling it is desirable to create assemblies made up of multiple web handling elements. For example, splicing two webs is a common operation and identifying this splicing assembly during web path generation aids in efficient process modeling. The web path building tool needs to accommodate the definition of these and other appropriate assemblies.

Once the ordered list of web parts and assemblies have been established, it is necessary to determine the rotation direction for each element. For many of the elements, only a single rotation is feasible based on geometrical considerations. A provision must be included to allow the rotation direction to be adjusted to address situations where the rotation direction is ambiguous.

For modeling behavior of a continuous web of material going through the equipment, it is necessary to know certain geometrical information that can be computed from the web path described above. These include: span length between web handling elements, diameter of web handling elements, angle of wrap of web around web handling elements, and angle of twist between non-parallel web handling elements. The resulting web path information, including the model inputs, can be stored in a number of formats. One approach is to use an XML schema that contains the information described above needed for the web models as well as the geometrical information necessary to recreate the web path representation. This file can also be used to as an archive approach for the web paths.

An additional use for the web path information is to make it available in a CAD Format. This will enable visualization of the web within the CAD drawings of the equipment, checking for interference with equipment, and training of operators for web threading operations. To meet this need, the web paths can be exported into a number of CAD formats such as the .jt standard.

The method 100 includes a fourth step 140 of determining the virtual measures and model properties of the product web. These details are stored in a conversion model. The details may also be stored in a database. These properties may be chosen by the user as fixed or variable.

It is desirable to perform models of the transport of continuous webs of materials with equipment used for the manufacture of disposable absorbent articles. This requires extraction of specific information about the path the continuous web makes through the production equipment from unwind stands to combining points and through composite webs made of multiple materials.

Once the order of assembly and web path is designed, a 3D digital representation of an individual partial product at each step in the order of assembly may be created. This individual partial product may be as simple as a single web or sheet, or be comprised of several webs and components at any step in the manufacturing process. Additionally, one or more joint component webs may be placed between adjacent individual partial products. Joint component webs refer to webs that are divided during the manufacturing process such that a portion of the web is located as a portion of a first product while the other portion of the web is located as a portion of a second product adjacent to the first product. The individual partial product can be duplicated and connected to form a multi-product web, for example ten products-long. The multi-product web may share one or more webs that will be separated to make the individual products, such as, for example, a backsheet web. Additionally, one or more joint component webs may be located connecting adjacent products. Algorithms may be defined to account for components that bridge across the end cut of continuous web of absorbent articles before they are discretized by a final cutting process. In addition to defining the 3D form of the product at each production step, other product quality specification requirements that are either partially or completely determined by that step may be defined, such as the requirement for adhesive bond strength between two adherends and an adhesive. These requirements could be predicted by a simulator for that portion of the production process.

This digital web may be imported into finite element modeling software such as Dassault's Simulia, meshed and prepared for subsequent process simulation. In this way, complex webs with non-uniform properties may be simulated to predict complex web behavior such as wrinkling, lateral steering, and longitudinal registration.

In addition to creating simulated webs at any stage of the manufacturing process, simulated images of the web at any stage of manufacturing may be used to facilitate calibration and set up of industrial imaging cameras for quality control in manufacturing.

The web may be simulated to account for variation in caliper, basis weight, coefficient of friction, or elasticity. Light-weight webs are especially prone to these issues because the variation is proportionally more when compared to the average modulus. Traditionally, all webs are modeled with a uniform modulus and Poisson's ratio. This creates an untrue assumption that all elements of the web have the same material properties.

Without being bound by theory, Applicants have found that Gaussian random fields may be utilized to give materials variation that is reasonably natural and consistent with what is observed in real non-wovens. Image or measurement techniques or forms for measuring mass variation of a web such as a non-wovens can be calibrated to determine a mass density image or a scan of the web. One of these forms of measuring mass variation is optical scans. Other forms of measuring mass variation may include sensors based on other measurement schemes such as, for example, ultrasonic sensor from MeSys GmbH, Greifendber, Germany and Beta gauges such as those sold by NDC Technologies, Irwindale, Calif. This mass density image is analyzed to determine the appropriate scale and orientation of the observed variation. For example, the nonwoven may vary at a lower spatial frequency in the Machine Direction (MD) when compared to the Cross Direction (CD). The Gaussian random field for mass density can be translated to material properties via imaging of samples and homogenization techniques to link the physical properties of the optically scanned web and the virtual responses of the simulated web for one or more mechanical tests.

Because there will be different instances of the production system simulation depending on material selections and product style (e.g. premium product versus a lower cost product) and size, a user interface is provided to enable selection of a product style and size and associated materials and production lines (or part of a production line) to be used in the simulation. This configuration tool enables selection of the relevant inputs from the production system historian, material property database, web path information (e.g. web wrap angles and span lengths) from an equipment database and digital product design tool and imports the inputs to the simulator.

The computer user interface could be for example part of a Product Lifecycle Management system such as Dassault's Enovia Virtual Teaming, Requirements Central and Simulation Lifecycle Management applications or a stand-alone user interface such as EASA Software's web-based user interface or other user interface programming platforms such as Microsoft's Windows Presentation Foundation or the Python programming language.

The method 100 includes a fifth step 150 of importing the web property data into a web converting model.

Importing the web property data into a web converting model may include current production data. After the model is configured, the user manually adjusts any inputs or process flows in the user interface of the simulator if desired to explore new operating conditions. The simulation is then run in a computer system, such as on an individual laptop or high performance computing network, and the predicted outputs generated and stored. The simulation could alternatively be run as separate, parallel simulations in different models, and the results aggregated in a dashboard as described below.

A web converting process designed to produce absorbent articles such as diapers or feminine pads can be constructed of flexible modules that can be connected together as described in U.S. Pat. No. 6,574,520. Each module contains a series of unit operations or material transformations, such as lamination, die cutting or web slitting, connected by web transport paths between them.

The proper order of these operations to deliver the product components in the right relationship can be described by the digital Order of Assembly derived from a digital product model and a 3D CAD representation of production equipment described above.

Similar to the physical production equipment, engineering models of the unit operations or transformations may be built in a number of ways, but preferably in a hierarchical structure where components may be modeled and connected into assemblies. Since a diaper or feminine pad is primarily a successive assembly of layers, the Order of Assembly defines what the product web is intended to be at each step in the production process and its properties may be physically or virtually determined.

Individual unit operations or portions of web handling systems may be simulated using finite element modeling software such as Dassault's Simulia, as described in U.S. Pat. No. 8,700,364. However, current computational limitations of hardware and software do not permit integrated, full scale simulations of a diaper manufacturing process using these kinds of models directly in a practical solution time.

Computational experiments on these types of models can be done to generate response surface models, also known as surrogate models, to enable them to be used in more complex simulations. However, integrating these individual models is enabled using process system simulation tools described below.

Larger, more complex simulations can be executed using hierarchical modeling/simulation software, such as gProms, by Process Systems Enterprise (PSE), or models/simulations based on Modelica, an object-oriented modeling language for component-oriented models of complex systems. Modelica has open source versions, e.g. OpenModelica and jModelica, as well as commercial versions, e.g. Dassault's Dymola and Wolfram's SystemModeler. Other simulation approaches such as sequential modular simulators, for example IDEAS by ANDRITZ, Inc., USA, are possible.

These programs allow a complex system to be simulated by connecting models of individual components, defining appropriate boundary conditions, appropriate initial conditions and simulation time frames. For example, unwinds and rollers in web transport systems can be modeled using rotational elements such as bearing friction, inertia, clutches and brakes. Hot melt adhesive systems are modeled using fluid elements such as pipes, vessels, valves and sensors. These components may be combined into web paths for individual webs, and these web paths may be combined to form composite web paths. These composite web paths may be collected in a hierarchical manner into Feature Modules that describe one portion of the total production process, such as the part of a diaper production system that produces the absorbent core. Feature Modules may be connected to form a complete production system. Process control strategies such as, for example, Proportional-Integral-Derivative controllers for equipment may also be modeled using these types of models to accurately predict production equipment. Steady-state and transient conditions may be simulated, including, for example, line ramp-ups, steady operation, splice events, and ramp-downs.

Surrogate models or empirically-derived models can be incorporated into such hierarchical models in addition to first principles models. These programs also allow co-simulation between simulations running in parallel applications, for example through the use of Functional Mockup Interfaces.

For a large system, the number of inputs for such a model can be very large, e.g. thousands for a diaper manufacturing process, as over 20 different raw materials must be processed from their unwind stand, fluid tank or powder hopper through a dozen modules each containing multiple unit operations.

In addition to the hierarchical models described above, the trend toward lower cost digital sensors, including cameras, and lower cost data storage, has enabled vast amounts of data to be collected and stored for analysis from current production systems. These sensor data may be stored in historians such as General Electric's Proficy Historian, as disclosed in U.S. Patent application 20150066187.

These data may be visualized and analyzed using a number of commercial tools, such as Asset Predictive Analytics solution from SAS located at Cary, N.C., or General Electric's Proficy Historian Analysis, Cause+ and Troubleshooter.

Variation in system parameters from current production or multiple lots of materials may be modeled and used to provide distributions for use in statistical Designed Experiments or Monte Carlo simulation of the production system through iterative simulation runs, resulting in more accurate hybrid models that combine both first principles engineering models with actual production data. Alternatively, the variation can be included as time varying inputs into a dynamic simulation of the production process.

The human resource cost in terms of people and time is prohibitive to input manually material property, machine and process parameters and setpoints into a large simulation of a complete absorbent article production process simulation. Even if accomplished once, changes in raw material supply, product design, and equipment replacement due to market changes make such a model obsolete quickly. In addition the number of product sizes and variants for different consumer market segments require several different instances of the simulation, and manually entering and managing all these configurations becomes intractable.

This part of the invention exports the relevant material properties from a material property database and relevant machine set points and actual values and measured quality data from current production system historians associated with each process step defined in the Order of Assembly. These exported data are imported into a hierarchical simulator to enable part or all of a production system, such as for absorbent articles, to predict outcomes such as product quality or process reliability for proposed changes.

Computer languages like Extensible Markup Language (XML) or Python may be used as common data formats or scripts to connect production system historians and a material property database to automatically populate in a hierarchical simulator the inputs needed for each machine and material component at the appropriate step in the production process.

The method 100 includes a sixth step 160 of evaluating the manufacturing process capability and creating one or more manufacturing performance indicators.

Because there will be different instances of the production system simulation depending on material selections and product style (e.g. premium product versus a lower cost product) and size, a user interface is provided to enable selection of a product style and size and associated materials and production lines (or part of a production line) to be used in the simulation. This configuration tool enables selection of the relevant inputs from the production system historian, material property database, web path information (e.g. web wrap angles and span lengths) from an equipment database and digital product design tool and imports the inputs to the simulator.

The computer user interface could be for example part of a Product Lifecycle Management system such as Dassault's Enovia Virtual Teaming, Requirements Central and Simulation Lifecycle Management applications or a stand-alone user interface such as EASA Software's web-based user interface or other user interface programming platforms such as Microsoft's Windows Presentation Foundation or the Python Programming language.

After the model is configured, the user may manually adjust any inputs or process flows in the user interface of the simulator if desired to explore new operating conditions. The simulation is then run in a computer system, such as on an individual laptop or high performance computing network, and the predicted outputs generated and stored. The simulation will produce one or more manufacturing performance indicators. Manufacturing performance indicators may be in the form of a report, a text, a dashboard, a color, a sound or other sensorial alerts, or any other presentation of information to the user that produces an outcome from the simulation, e.g. charts of the key performance indicators by web span or time. The simulation could alternatively be run as separate, parallel simulations in different models, and the results aggregated in a dashboard as described below. Other applications for the simulation include but are not limited to: Automatic simulation of new lots of raw material with varying material properties from previous lots, Operating setpoint optimization to respond to changes in equipment condition or raw materials, Operator training using the dynamic simulation with Human Machine Interfaces as they would be used in Manufacturing, Virtual Controls Validation, and Transient condition product quality and reliability optimization (splicing events, ramp up's and ramp down's).

The method 100 includes a seventh step 170 of iterating the model to determine the optimal settings for each variable and each part of the order of assembly.

Optimization algorithms or techniques such as Evolutionary Optimization (EVOP), as defined by George Box in 1957, "Evolutionary Operation: A Method for Increasing Industrial Productivity", Journal of the Royal Statistical Society, Series C (Applied Statistics) 6 (2):81-101 doi:10.2307/2985505 JSTOR 2985505, can be employed to automatically change inputs against an objective function to meet the requirements or a user can manually iterate to achieve the desired outcomes via multiple model runs. An objective function may be, for example, a total manufacturing cost, the minimum use of an adhesive, determining the lowest number of rollers needed, minimizing the amount of unused web. The simulation may iterate the model in a self responding feedback loop that allows the simulation to modify multiple variables simultaneously. The ability to modify multiple variables simultaneously at different portions of the simulation and test against the objective functions serves as an improvement in the manufacturing process. It is understood that the examples serve as a few representations of possible objective functions and should not be interpreted as restrictive. Alternatively, statistically-designed experiments may be run on the simulator, and the results modeled in statistical software like SAS/JMP and the Profiler in SAS/JMP used to select simulator inputs that optimize the Desirability of the system against requirements.

The method 100 may further include an eighth step 180 of building an optimal design based on the validated optimal settings.

The predicted inputs to the simulator may be used as setpoints in a physical production system and validated physically in either a specific test of a portion of the production system or at full scale in production using EVOP described above or in a specific single validation experiment.

The simulation above may be used to determine the appropriate manufacturing process for a product that must meet a set objective. The simulation may be used to determine the variation of setup or design of a "real" manufacturing process versus the simulation. Once the optimal design for the manufacturing process is known, the user can either build a new manufacturing line or make changes to a manufacturing line to manufacture the product having one or more webs. Changes to a manufacturing line may include, for example, changing the position of one or more rollers in the web path, changing a roller from being an idler roller to one directly driven by a motor, changing the amount of adhesive applied to the product, changing the position of adhesive in the product, changing the placement of a web or a component of a web, removing or adding modules in a modular manufacturing system, and combinations thereof.

The simulator may be used to optimize aspects of the product design, process and/or equipment design, the materials used in the product, and the manufacturing operation of the process. These use cases for the simulator are not limited to these areas, rather they are examples for illustration described below.

Product Design Optimization for Manufacturability

For the product design, the simulator may be used to optimize the manufacturability and quality of a given product design by using, for example, a Monte Carlo simulation. The simulation may vary roller speeds, effects of contamination, roller alignment, material properties such as modulus of elasticity, the bearing drag of idler rollers, the coefficient of friction between rollers and other parameters known by those of ordinary skill in the art to predict the machine-direction placement of components in the final product due to registration variation. The simulation may vary the inputs as part of the iteration step of the simulation. During the iterative step, the simulation may choose to change inputs to the other steps in the method such as, for example, the simulation may modify the order of assembly, modify the roller positions, modify the web path, and evaluate the manufacturing process capability.

By varying the inputs, the simulator can adjust the machine direction position and cut length of components such as diaper fastening tabs and their shapes in the design to ensure that even with production variation, the product design will meet users' needs. For example, the machine direction position of diaper back ears may be placed on a product 2D layout drawing such that they will not be inadvertently cut by the final cutting process given a predicted level of process variation. For the process design, the simulator may be used to optimize the best order of assembly for the components taking into account variation in the components' machine and cross-machine direction variation. For example, if two webs are to be laminated together and their edges are required to be coterminous and there are process operations to be done on each individual web such as slitting or die cutting in addition to lamination, the order of lamination versus process operation may require several options to be analyzed to find the optimal order of assembly that meets all product requirements, particularly if there are trade-offs between requirements. The simulator can allow for multiple orders of assembly having different roller alignments to be run and the resulting product variation to be predicted and the optimization algorithm can recommend the order of assembly that best meets the product requirements with constraints.

Capital Cost Optimization

The simulator may also be used to optimize the capital cost of the production system. For example, in a web handling system, there is an optimal number of rollers, both driven and undriven (idlers) to transport a web from the unwind station through the production process. Each driven roller requires a motor and controller, so it is desirable to minimize cost of the web handling system by not driving every transport roller, rather only a minimum number required to maintain tension/strain in the web for lateral and longitudinal control. The simulator can enable repeated scenarios to be evaluated for the number and type of rollers in a web path to find the optimal path at the lowest capital cost while delivering an acceptable tension/strain profile in each span of the path. This optimization may be automated via several approaches, for example, by using an algorithm that simultaneously minimizes both capital cost and tension variance of the total web path by varying which rollers are driven or undriven, or by minimizing the difference in tension between upstream and downstream spans and minimizing the capital cost of the web path simultaneously.

Alternatively, the algorithm could convert undriven rollers to be driven when the model predicts a tension or strain below a desired limit in a particular span. Finally, an exhaustive search algorithm could test every combination of each roller either being a driven or undriven roller and choose the combination of driven/undriven rollers in the web path that simultaneously minimizes capital cost and tension/strain variance with the constraint of lower or upper limit tensions/strains. An alternative use for the simulator using, a simulation such as, for example, the Monte Carlo approach described in the product design optimization above would be to optimize process control parameters, for example proportional-integral gains for motor controllers for driven rollers. Other commonly-known process control tuning algorithms may be used in the simulator to optimize the dynamic response of the production system.

Material Utilization Optimization

With respect to material utilization optimization, the simulator may be used in several cases to optimize the cost of materials used in the product design. For example, many absorbent articles are constructed using hot melt adhesives. There is an optimal level of adhesive to be used to achieve the desired bond strength between layers without increasing the risk that the adhesive will bleed through porous nonwoven layers onto equipment or in the folded diaper in a bag. Adhesive contamination on rollers can lead to web breakouts that cause the production process to stop. There are also scrap products generated from each machine stop. Using the simulator to try different targets for adhesive add-on level and predicting the bond strength and bleed-through probability, the optimal level may be selected using the simulator. The bond strength and bleed-through are a function of the porosity of the substrates, rheological properties of the adhesive, pressure applied to the bond, etc.

Another material utilization optimization case is the ability to optimize the roll widths of webs used in the product. The simulator may be used to predict the material width at each span in the web path as a function of material properties such as machine direction and cross machine-direction modulus of elasticity and Poisson's Ratio and tensions/strains. For example, the starting roll width can be optimized to ensure that the material width will be wide enough to ensure spray adhesive application will contact the necked-down web, avoiding adhesive contamination leading to machine stops. This could be ensured by specifying materials much wider than necessary, but at a non-optimal cost without the use of the simulator. Similar analyses may be done for other material properties such as basis weight (mass/unit area) or caliper (thickness).

Manufacturing Operation Optimization

Operation of the manufacturing process may be optimized by enabling operators and process engineers to virtually test the process using the simulator. Operators and process engineers may try scenarios with different process setpoints and see the effects without actually causing machine stops or product quality issues. They can also virtually replicate physical failure modes they observe in the actual production process in the simulator to troubleshoot the basic cause of machine stops or quality issues. This optimizes manufacturing costs by reducing scrap, quality losses, improving process reliability, etc. For new materials to be run in their existing process, operators, process and material engineers may virtually test the new materials in the simulator in advance, using the simulator to optimize process setpoints to best convert the new materials. This reduces time, effort, and consumable materials on the actual equipment.

Figure 2:
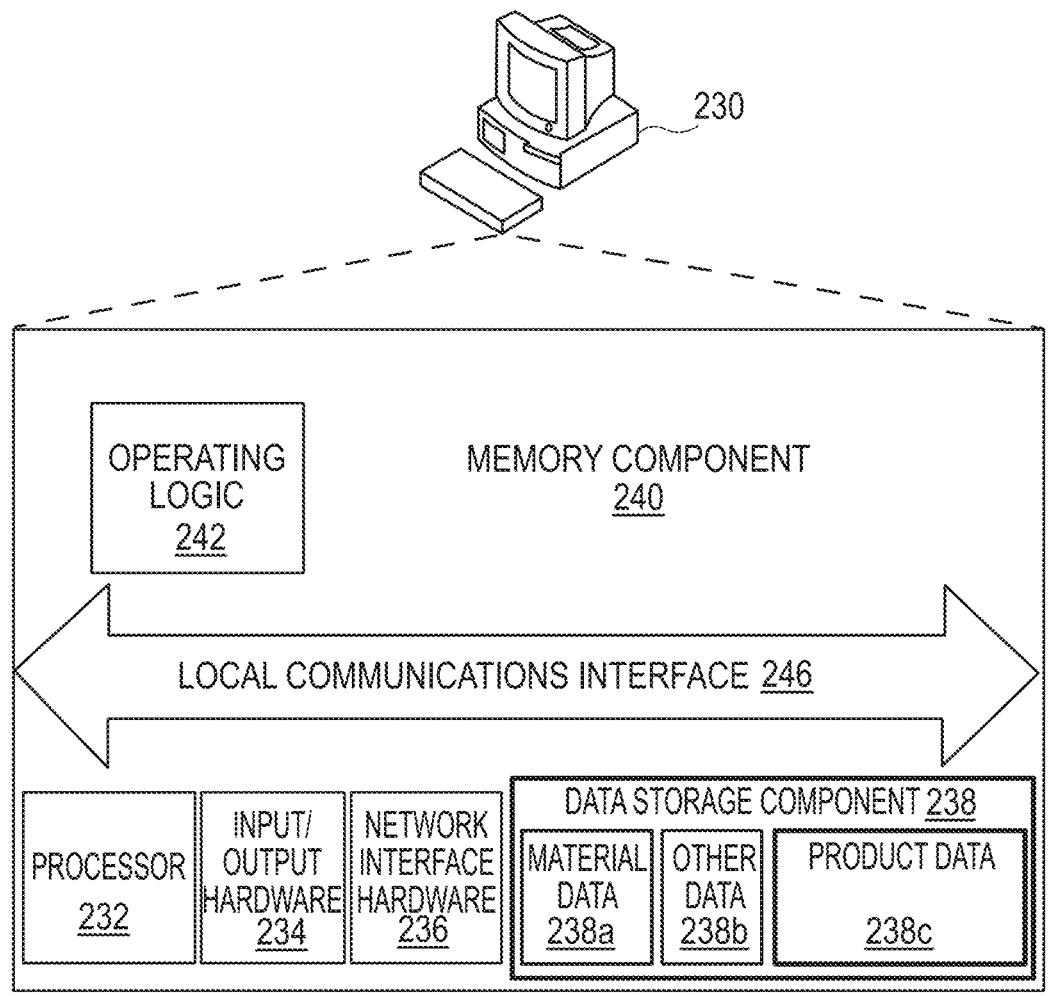
FIG. 2 is a chart illustrating a computer system.

FIG. 2 depicts a computing device 230 according to systems and methods disclosed herein. The computing device 230 includes a processor 232, input/output hardware 234, network interface hardware 236, a data storage component 238 (which stores material data 238a, other data 238b, and virtual product data 238c), and a memory component 240. The computing device 230 may comprise a desktop computer, a laptop computer, a tablet computer, a High Performance Computing system, a mobile phone, or the like.

The memory component 240 of the computing device 230 may be configured as volatile and/or nonvolatile memory and, as such, may include random access memory (including SRAM, DRAM, and/or other types of RAM), flash memory, registers, compact discs (CD), digital versatile discs (DVD), and/or other types of non-transitory computer-readable mediums. Depending on the particular configuration, these non-transitory computer-readable mediums may reside within the computing device 230 and/or external to the computing device 230.

The memory component 240 may be configured to store operating logic 242 that may be embodied as a computer program, firmware, and/or hardware, as an example. The operating logic 242 may include an operating system, web hosting logic, and/or other software for managing components of the computing device 230. A local communications interface 246 is also included in FIG. 2 and may be implemented as a bus or other interface to facilitate communication among the components of the computing device 230.

The processor 232 may include any processing component operable to receive and execute instructions (such as from the data storage component 238 and/or memory component 240). The input/output hardware 234 may include and/or be configured to interface with a monitor, keyboard, mouse, printer, camera, microphone, speaker, and/or other device for receiving, sending, and/or presenting data. The network interface hardware 236 may include and/or be configured for communicating with any wired or wireless networking hardware, a satellite, an antenna, a modem, LAN port, wireless fidelity (Wi-Fi) card, WiMax card, mobile communications hardware, and/or other hardware for communicating with other networks and/or devices. From this connection, communication may be facilitated between the computing device 230 and other computing devices.

It should be understood that the data storage component 238 may reside local to and/or remote from the computing device 230 and may be configured to store one or more pieces of data for access by the computing device 230 and/or other components. In some systems and methods, the data storage component 238 may be located remotely from the computing device 230 and thus accessible via a network. The data storage component 238 may be a peripheral device external to the computing device 230.

It should be understood that the computing device components illustrated in FIG. 2 are merely exemplary and are not intended to limit the scope of this disclosure. While the components in FIG. 2 are illustrated as residing within the computing device 230, this is merely an example. In some systems and methods, one or more of the components may reside external to the computing device 230. The simulation, code utilized to run the simulation, or code utilized to represent any part of the simulation may be read from a computer readable media separate from the computer. It should also be understood that, while the computing device 230 in FIG. 2 is illustrated as a single system, this is merely an example. In some systems and methods, the modeling functionality is implemented separately from the prediction functionality, which may be implemented with separate hardware, software, and/or firmware.

Also included is a non-transitory computer-readable medium that stores a program that when executed by a computing device causes the computing device to receive a 3-dimensional simulation of an absorbent article. Additionally, the program may further cause the computing device to determine a deformation characteristic of the product, simulate an interaction of the inner part into the outer part, measure, from the interaction, a characteristic of interaction, and determine whether the characteristic of interaction meets a predetermined threshold. In response to determining that the characteristic of interaction meets the predetermined threshold, the program may cause the computing device to send an output that indicates the first 3-dimensional simulation and the second 3-dimensional simulation are acceptable product designs. In response to determining that the characteristic of interaction does not meet the predetermined threshold, the program may iteratively alter the 3-dimensional simulation until the characteristic of interaction meets the predetermined threshold.

Figure 3:
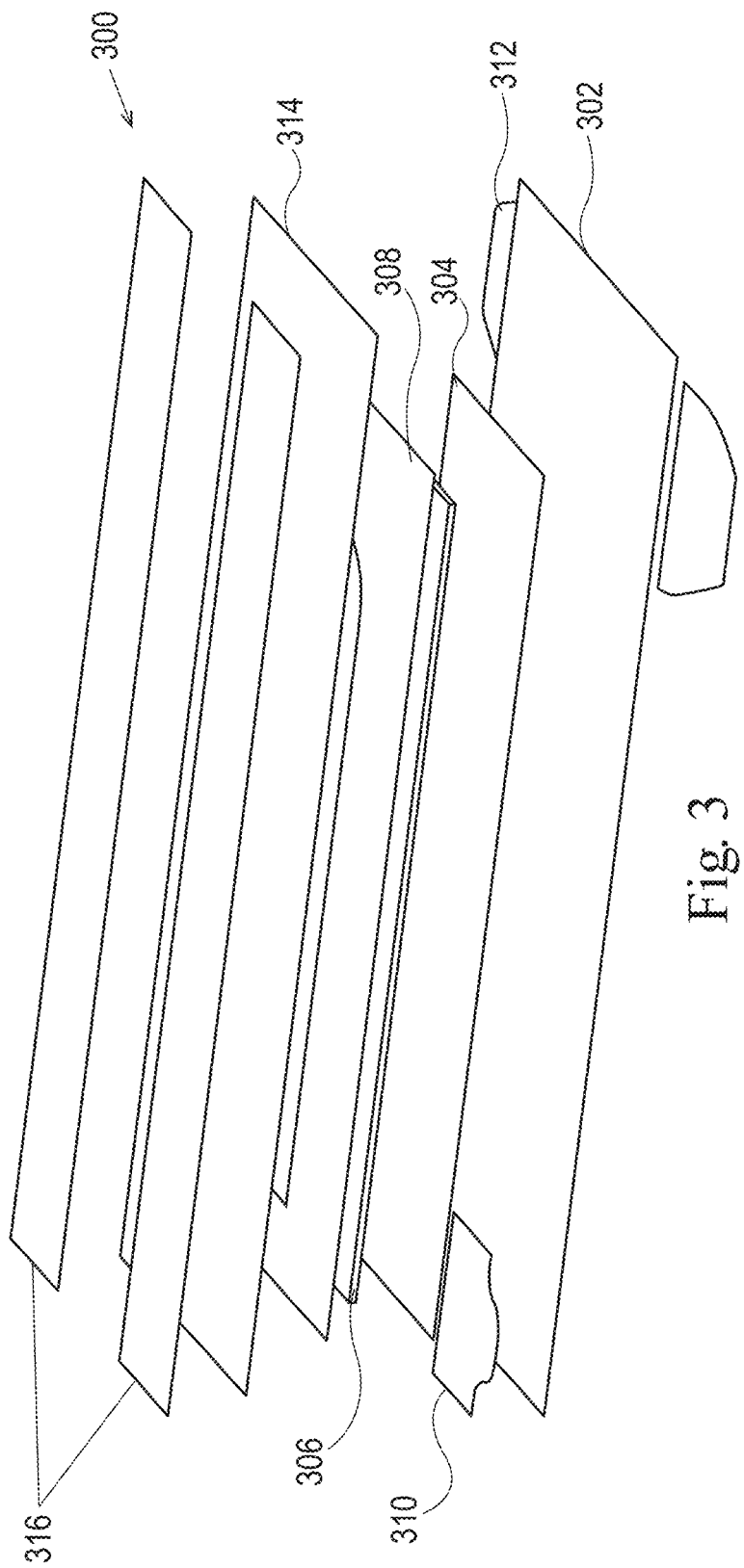
FIG. 3 is a representation of an absorbent article.

FIG. 3 shows a perspective view of a simulation of an absorbent article 300. As shown in FIG. 3, the simulation includes multiple webs such as, for example, a backsheet 302, a first core layer 304, a second core layer 306, a third core layer 308, one or more front ears 310, one or more back ears 312, a topsheet 314, and one or more barrier leg cuffs 316.

Figure 4:
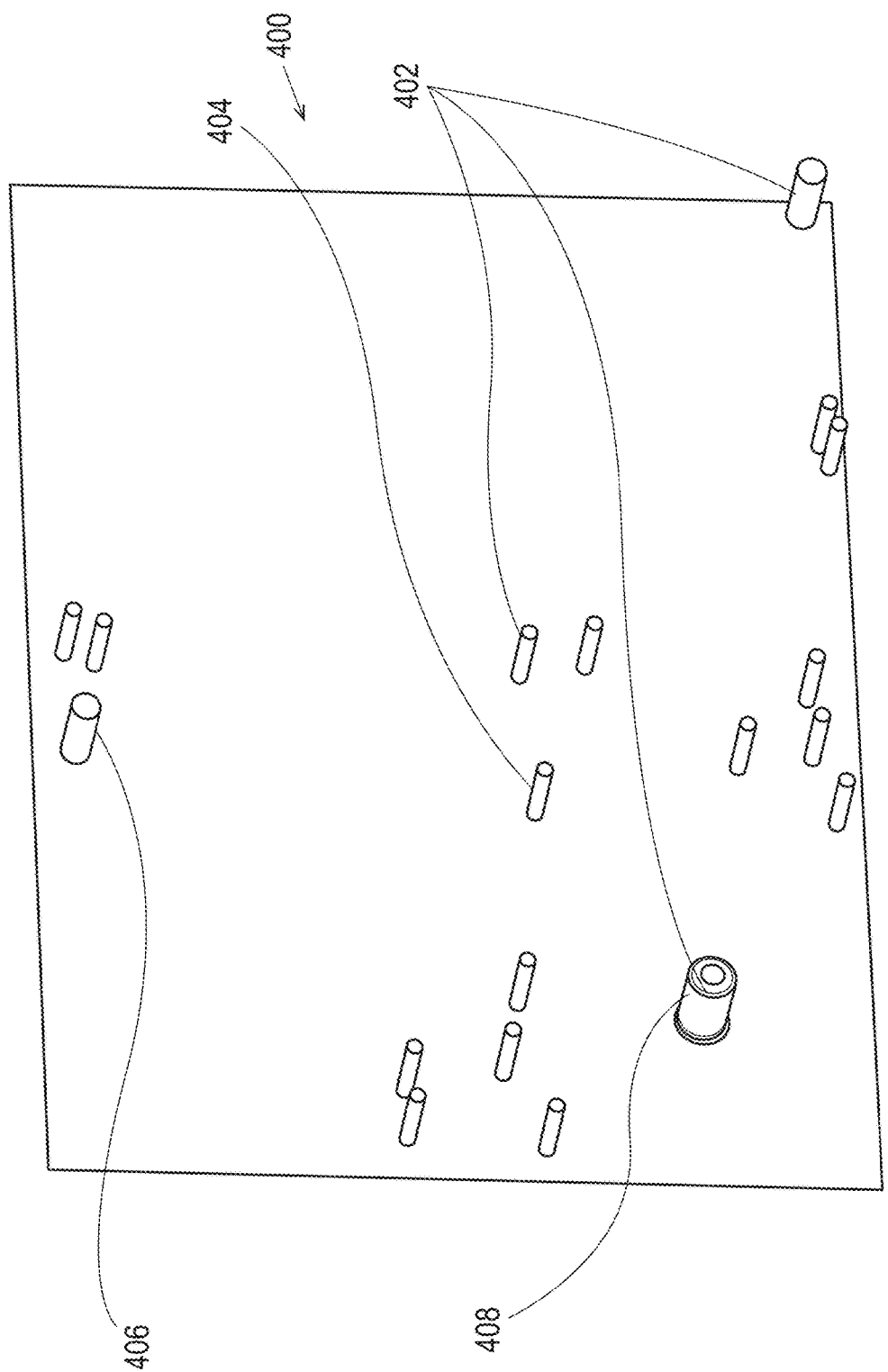
FIG. 4 is a representation of a web path.

FIG. 4 represents a web path 400 including multiple rollers 402, such as, idler rollers 404, unwind mandrel 408, and driven rollers 406.

Figure 5:
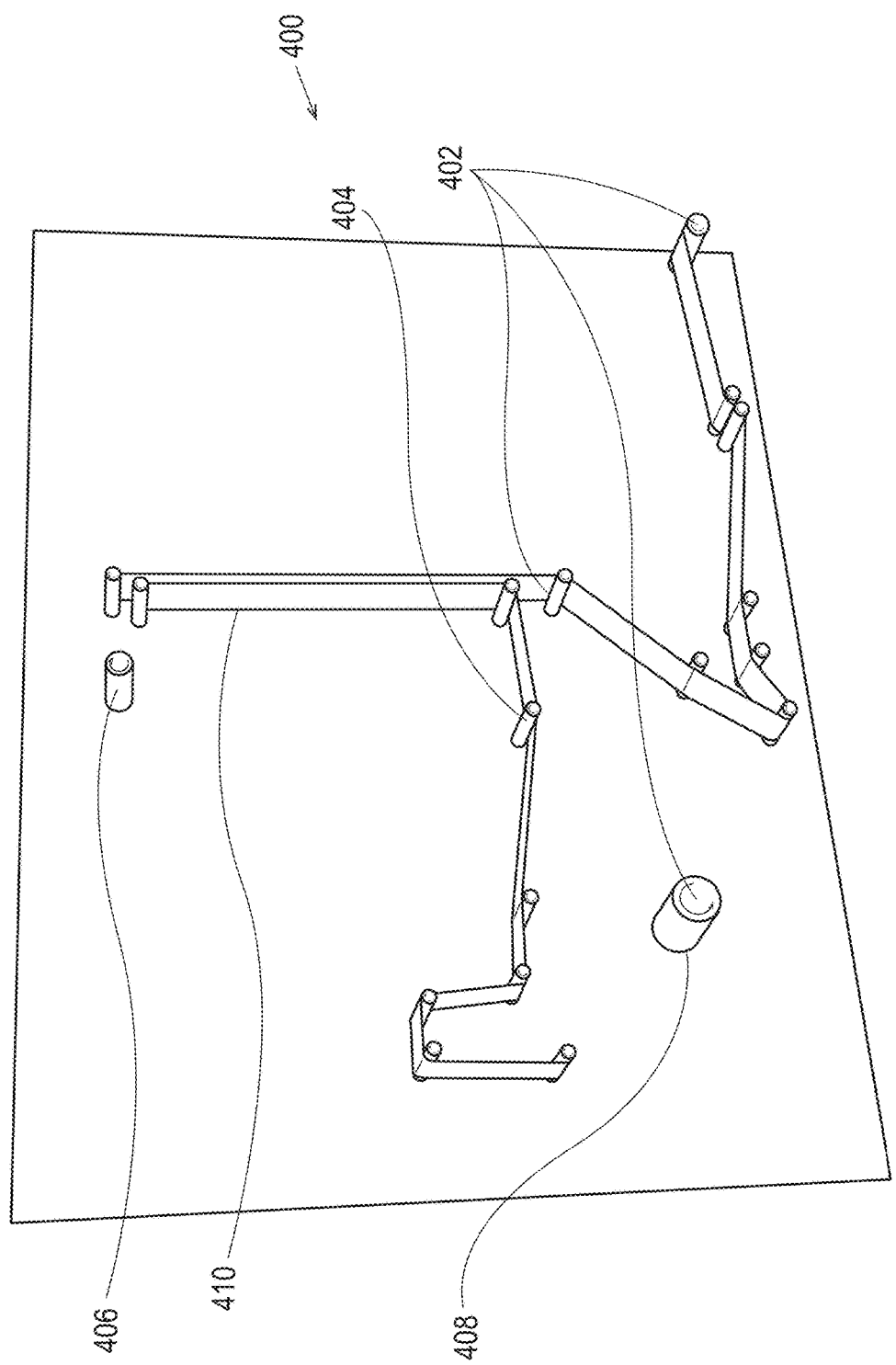
FIG. 5 is a representation of a web path.

FIG. 5 represents the web path 400 of FIG. 4 including a web on the web path. The web path 400 including multiple rollers 402, such as, idler rollers 404, unwind mandrel 408, and driven rollers 406. As shown in FIG. 5, a web 410 is on the web path 400.

Figure 6:
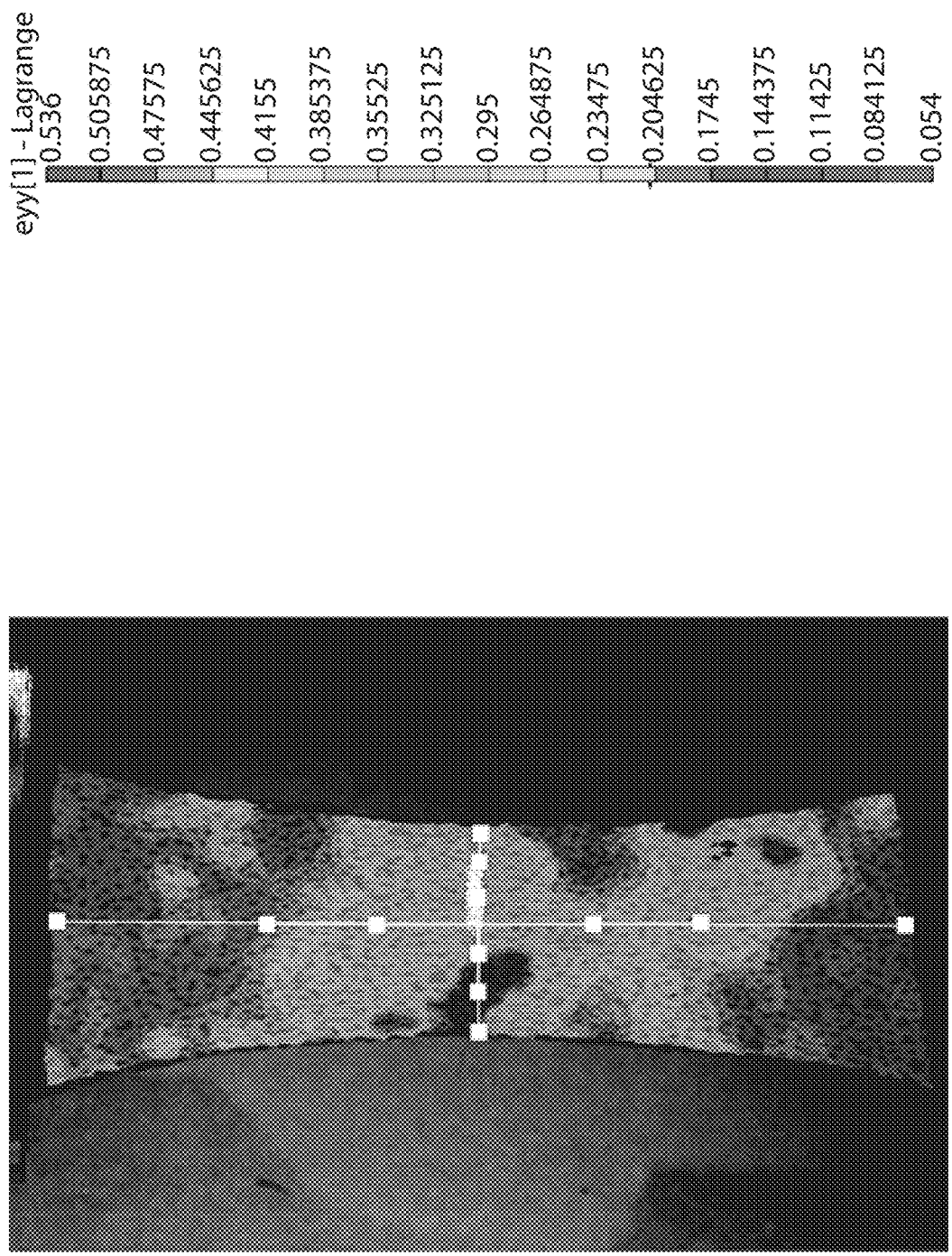
FIG. 6 represents a sample web under tension.

FIG. 6 represents a sample web under tension. As shown through the use of grayscale, relatively weak, low basis weight regions are lighter in shade while stronger regions with higher basis weight regions are darker. As described above, the image may be used when determining the Gaussian random field for mass density of a sample.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. A method for making a product comprising one or more webs, comprising:
    creating a computer based three dimensional simulation model of a product comprising one or more webs;
    defining an initial order of assembly;

extracting one or more roller positions and a web path and importing the one or more roller positions and web path to a web converting model;

determining the virtual measures and model properties of the product comprising one or more webs;

importing web property data into the web converting model;

evaluating the manufacturing process capability and creating one or more manufacturing performance indicators;

iterating the web converting model to optimize values for one or more chosen variables while satisfying the product requirements;

building a manufacturing line based on the web converting model with optimized values for chosen variables and producing a product comprising one or more webs based on the simulation model.

2. The method of claim 1, wherein creating a computer based three dimensional simulation model of a product comprising one or more webs comprises creating a three dimensional simulation model of an absorbent article.

3. The method of claim 2, wherein the simulation model of an absorbent article comprises one or more layers that comprise one or more components parts selected from the group consisting of adhesive patterns, curvilinear components, topsheets, mechanical fasteners, loop panels, absorbent cores, backsheets, and combinations thereof.

4. The method of claim 1, wherein the step of defining an initial order of assembly comprises showing where each component enters the production flow and how the product is built.

5. The method of claim 1, wherein the step of extracting one or more roller positions, a web path, and importing the one or more roller positions and web path to the web converting model comprises determining the required number and order of one or more rollers, one or more idlers, one or more driven rollers, one or more turn bars, one or more unwind mandrels, one or more folding boards, and combinations thereof.

6. The method of claim 1, wherein the step of determining the virtual measures and model properties of the product comprises creating a three dimensional digital representation of an individual partial product comprising one or more webs at each step in the order of assembly.

7. The method of claim 6, wherein the web comprises a plurality of individual partial products, wherein the simulation model of the product allows for joint component webs between adjacent individual partial products.

8. The method of claim 1, wherein the step of evaluating the manufacturing process capability and creating one or more manufacturing performance indicators comprises adjusting one or more inputs, adjusting one or more process flows, or combinations thereof.

9. The method of claim 1, wherein the step of iterating the web converting model to optimize values for one or more chosen variables while satisfying absorbent article requirements comprises allowing the web converting model to automatically change inputs against an objective function.

10. A method for modeling a manufacturing line using a computer for making a product comprising one or more webs, the method comprising:

creating a computer based three dimensional simulation model of an absorbent article;

defining an initial order of assembly;

extracting one or more roller positions and a web path and importing the one or more roller positions and web path to a web converting model;

determining the virtual measures and model properties of the absorbent article product web;

importing web property data into the web converting model;

evaluating the manufacturing process capability and creating one or more manufacturing performance indicators;

using iterative of the web converting model to optimize values for one or more chosen variables while satisfying absorbent article requirements; and building a manufacturing line based on the web converting model with optimized values for chosen variables and producing a product comprising one or more webs based on the simulation model.

11. The method of claim 10, wherein creating a computer based three dimensional simulation model of an absorbent article includes creating a simulation model of a product comprising multiple layers.

12. The method of claim 11, wherein the layers comprise one or more component parts selected from the group consisting of adhesive patterns, curvilinear components, topsheets, mechanical fasteners, loop panels, absorbent cores, and backsheets.

13. The method of claim 10, wherein one or more layers are simulated using Gaussian random fields.

14. The method of claim 13, wherein simulating using Gaussian random fields further comprises creating a scan of a web, analyzing the scan to determine the appropriate scale and orientation for mass variation in the web, and linking the physical and virtual responses for the optically scanned web and the simulated layer.

15. The method of claim 10, wherein the step of extracting one or more roller positions, a web path, and importing the one or more roller positions and web path to the simulation comprises determining the required number and order of one or more rollers, one or more idlers, one or more driven rollers, one or more turn bars, one or more unwind mandrels, one or more folding boards, and combinations thereof.

16. The method of claim 10, wherein the step of determining the virtual measures and model properties of the absorbent article product web comprises creating a three dimensional digital representation of an individual partial product comprising one or more webs at each step in the initial order of assembly.

17. The method of claim 10, wherein the step of evaluating the manufacturing process capability and creating one or more manufacturing performance indicators comprises adjusting one or more inputs, adjusting one or more process flows, or combinations thereof.

18. The method of claim 10, wherein the step of using iterative logic to optimize values for one or more chosen variables while satisfying absorbent article requirements comprises allowing the web converting model to automatically change inputs against an objective function.

* * * * *